UNITED STATES PATENT OFFICE.

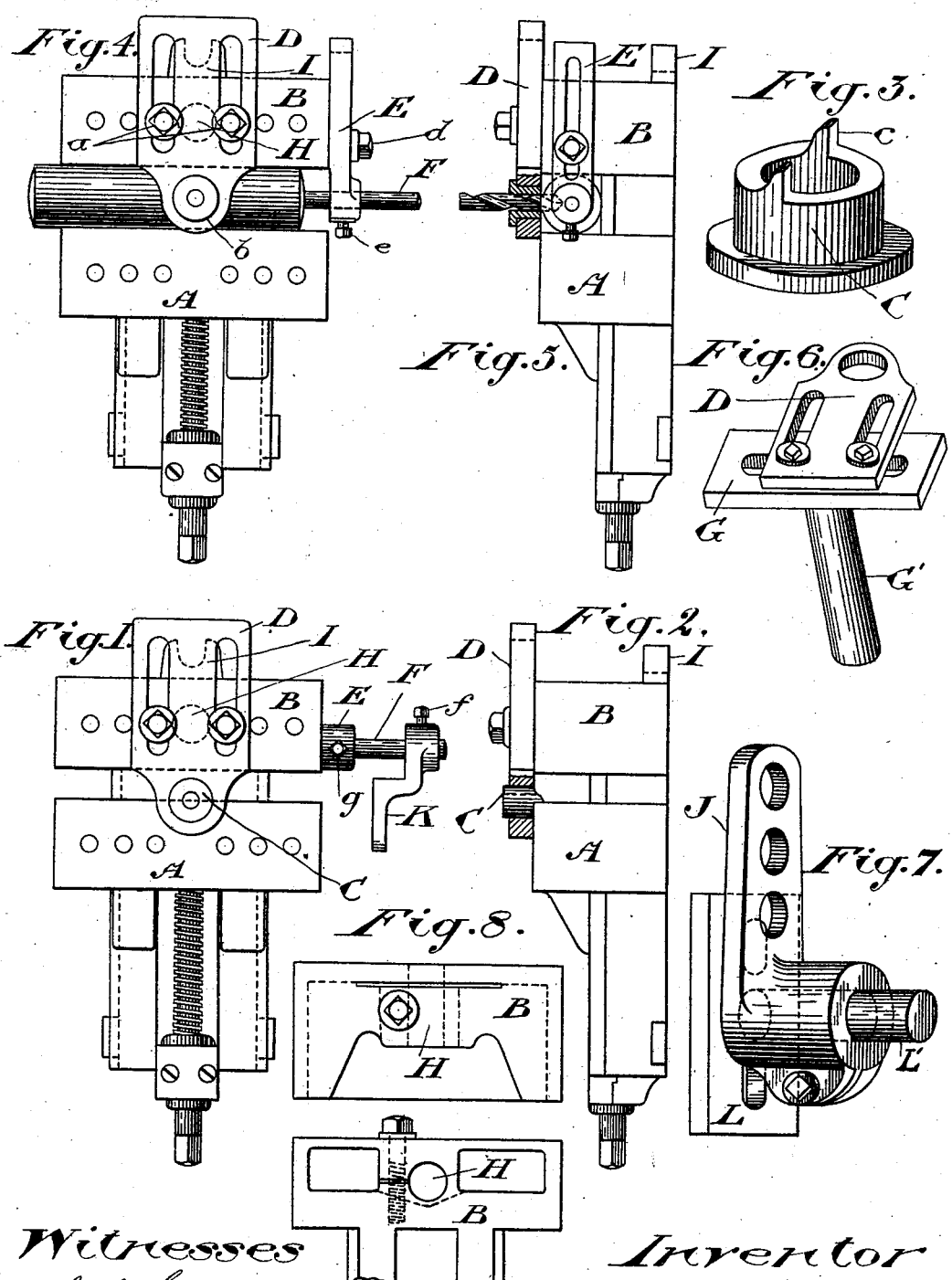

JOHN JAMES STEVENS, OF GALT, CANADA.

DRILL-VISE AND ATTACHMENT FOR SAME.

SPECIFICATION forming part of Letters Patent No. 668,695, dated February 26, 1901.

Application filed March 26, 1900. Serial No. 10,308. (No model.)

*To all whom it may concern:*

Be it known that I, JOHN JAMES STEVENS, draftsman, of the town of Galt, in the county of Waterloo, Province of Ontario, Canada, have invented certain new and useful Improvements in Drill-Vises and Attachments for Same, of which the following is a specification.

The object of my invention is to devise improvements in drill-vises and attachments by means of which any number of like articles may be drilled in exact correspondence with one another; and it consists, essentially, in providing one of the jaws of the vise with an adjustable guide-plate provided with one or more holes in which may be inserted a bush for use in setting the plate or a bush for guiding the drill and in providing one of the jaws with an adjustable end stop for the work, all substantially as hereinafter more specifically described and then definitely claimed.

Figure 1 is a plan view of a vise provided with my improvements. Fig. 2 is an end view of the same. Fig. 3 is an enlarged perspective view of the bush employed in setting the plate which is used to guide the drill. Fig. 4 is a plan view of a vise provided with a modification of the end stop shown in Fig. 1. Fig. 5 is an end view of the same. Fig. 6 is a perspective view showing a modification of the drill-guide plate shown in Figs. 1, 2, 3, and 4. Fig. 7 is a perspective view showing another modification of the same. Fig. 8 is a side view of one of the jaws of the vise, showing the means of vertically adjusting the guide-plate shown in Fig. 6. Fig. 9 is a view of the under side of the jaw shown in Fig. 8.

In the drawings like letters of reference indicate corresponding parts in the different figures.

B is the stationary jaw of the vise, and A the movable jaw, which is provided with the usual means for operating it which need not here be described.

D is a slotted plate which is secured to the jaw B by means of the bolts $a$ $a$ passing through the slots and screwed into suitably-threaded holes in the upper surface of the jaw. A portion of this plate projects inwardly toward the movable jaw and has a hole $b$ formed therein. When the plate is to be set ready for work, a bush C is inserted therein. (See Figs. 2 and 3.) This bush has formed on one end one or more projections $c$, the straight faces of which are coincident with the plane coinciding with the axis of the bush. When setting the plate D, this bush is placed in position, as shown in Fig. 2, and the loose jaw of the vise adjusted so that the space between it and the stationary jaw B is equal to the desired distance the center of the drill is to be set from the face of the jaw B. Plate D is then moved to draw the straight faces of the projections $c$ against the face of the jaw A, when the plate D may be securely clamped in position by tightening the bolts $a$. The bush C may then be removed, the work clamped in position between the jaws, and a bush of ordinary construction substituted for C for the purpose of drilling. (See Fig. 5.)

When articles are being drilled which extend above the upper surface of the jaws A and B, I employ the modification of the plate D which is shown in Fig. 6. The plate D instead of being clamped directly to the jaw of the vise is clamped by means of the bolts $a$ to the plate G, which is provided with a stem G'. The jaw of the vise, to which the plate is to be connected, is provided with hole H', having a split extending from one side thereof. A bolt is provided extending through the split, by means of which the metal surrounding the hole may be caused to tightly clamp the stem G'. Of course other clamping devices might be employed for the purpose.

In the construction shown in Figs. 1 and 4 the plate D is made laterally adjustable by providing a series of holes in the jaws of the vise for the bolts $a$.

In the construction shown in Fig. 6 the same end is accomplished by slotting the plate G.

In Fig. 7 is illustrated another modification of the plate D, which is used when it is desired to drill two or more holes in one article at the same setting. The plate L is clamped to one of the jaws of the device by means of the bolts $a$. The plate being slotted permits of the lateral adjustment. A stem L' extends upwardly from the plate and has adjustably clamped upon it the plate J, provided with two or more holes. This may be raised to any desired height, swung over the article to be drilled, and clamped in position.

I also employ in connection with the vise an end stop, against which the end of the article to be drilled abuts. This stop consists of a plate E, suitably bolted to one of the jaws of the vise by means of the bolt $d$ extending through a slot in the plate into the end of the jaw. The inner end has a hole formed therein through which passes a rod F, suitably clamped in position by means of the set-screw $e$.

In case the object to be drilled extends beyond the ends of the jaws of the vise I prefer to form the end stop as shown in Fig. 1, in which K is a stop-plate, adapted to slide upon the rod F and adjustable thereon by means of the set-screw $f$. The rod F in this case is inserted in a hole in the end of the plate E and clamped therein by means of the set-screw $g$. The plate E is preferably turned to a vertical position when the end stop is so constructed.

What I claim as my invention is—

1. In a drill-vise, the combination with the stationary and movable jaws of a guide-plate provided with a hole in one end and adjustably secured to one of the jaws so that it may be moved to set the said hole at any desired distance from the working face of the stationary jaw, substantially as and for the purpose specified.

2. In a drill-vise, the combination with the stationary and movable jaws of a guide-plate provided with a hole in one end and adjustably secured to one of the jaws so that it may be moved to set the said hole at any desired distance from the working face of the stationary jaw; and a bush for the said hole provided with one or more projections having faces lying in a plane coinciding with the axis of the bush, substantially as and for the purpose specified.

3. In a drill-vise, the combination with the stationary and movable jaws of a guide-plate provided with a hole in one end and adjustably secured to one of the jaws so that the position of the said hole may be adjusted both parallel to, and at right angles to the said jaws, substantially as and for the purpose specified.

4. In a drill-vise, the combination with the stationary and movable jaws of a guide-plate provided with a hole in one end and adjustably secured to one of the jaws so that the position of the said hole may be adjusted both parallel to, and at right angles to the said jaws; and a bush for the said hole provided with one or more projections having faces lying in a plane coinciding with the axis of the bush, substantially as and for the purpose specified.

5. In a drill-vise, the combination with the stationary and movable jaws of a guide-plate provided with a hole in one end and adjustably secured to one of the said jaws so that the plate may be adjusted parallel to, at right angles to, and at varying distances above the said jaws, substantially as and for the purpose specified.

6. In a drill-vise, the combination with the stationary and movable jaws of a guide-plate provided with a hole in one end and adjustably secured to one of the said jaws so that the plate may be adjusted parallel to, at right angles to, and at varying distances above the said jaws; and a bush for the said hole provided with one or more projections having faces lying in a plane coinciding with the axis of the bush, substantially as and for the purpose specified.

7. In a drill-vise, the combination with the stationary and movable jaws of a guide-plate provided with a plurality of holes toward one end, and adjustably secured to one of the said jaws so that the plate may be adjusted parallel to, at right angles to, and at varying distances above the said jaws, substantially as and for the purpose specified.

8. In a drill-vise, the combination with the stationary and movable jaws of a guide-plate provided with a hole in one end and adjustably secured to one of the jaws so that it may be moved to set the said hole at any desired distance from the working face of the stationary jaw; and a longitudinally-adjustable end stop secured to one of the jaws, substantially as and for the purpose specified.

9. A drill-vise provided with stationary and movable jaws and having one or more holes or grooves in the upper surface of one of the jaws for the reception of the means for connecting a guide-plate to the vise, substantially as and for the purpose specified.

In testimony whereof I have signed my name to this specification in the presence of two subscribing witnesses.

JOHN JAMES STEVENS.

Witnesses:
H. PERCY PITTS,
JOHN ALLAN MCDOUGALL.